(12) United States Patent
Kamisugi

(10) Patent No.: US 6,981,613 B1
(45) Date of Patent: Jan. 3, 2006

(54) PORTABLE PRESSURIZED LIQUID STORAGE SYSTEM

(76) Inventor: Cullen Kamisugi, 2500 Aha Aina Pl., Honolulu, HI (US) 96821

( * ) Notice: Subject to any disclaimer, the term of this patent is extended or adjusted under 35 U.S.C. 154(b) by 0 days.

(21) Appl. No.: 10/313,011

(22) Filed: Dec. 6, 2002

(51) Int. Cl.
B65D 35/28 (2006.01)
B65D 35/56 (2006.01)

(52) U.S. Cl. .......... 222/105; 222/93; 222/94; 222/95; 222/466; 222/608; 239/328

(58) Field of Classification Search .......... 239/146, 239/327, 328, 333, 360, 373, 323; 222/95, 222/105, 107, 608, 378, 175, 94, 93, 466; 604/183

See application file for complete search history.

(56) References Cited

U.S. PATENT DOCUMENTS

| | | | |
|---|---|---|---|
| 1,003,855 A * | 9/1911 | Adams | |
| 1,555,467 A * | 9/1925 | Graham | |
| 1,619,120 A * | 3/1927 | Heaton | 222/105 |
| 1,959,782 A * | 5/1934 | Fenwick, Jr. | 150/6 |
| 2,668,637 A * | 2/1954 | Gilmore | 222/95 |
| 3,170,171 A | 2/1965 | Mayhew et al. | |
| 3,393,835 A * | 7/1968 | Kantor et al. | 222/105 |
| 3,518,702 A * | 7/1970 | La Russa | 623/3.22 |
| 3,606,618 A | 9/1971 | Veech | |
| 3,681,788 A | 8/1972 | Le Blanc et al. | |
| 4,109,831 A * | 8/1978 | Culpepper et al. | 222/254 |
| 4,193,518 A * | 3/1980 | Holmes | 222/105 |
| 4,453,280 A | 6/1984 | Greenleaf | |
| 4,498,627 A | 2/1985 | Arginsky | |
| 4,501,533 A * | 2/1985 | Bower, Jr. | 417/388 |
| 4,822,053 A | 4/1989 | Flaherty | |
| 4,960,227 A * | 10/1990 | Coleman | 222/94 |
| 5,111,538 A | 5/1992 | Chapman | |
| 5,121,882 A | 6/1992 | Skidmore | |
| 5,161,266 A | 11/1992 | Hildebrand | |
| 5,230,566 A * | 7/1993 | Jackson et al. | 383/66 |
| 5,251,345 A | 10/1993 | Pechner | |
| 5,390,852 A | 2/1995 | Schuenemann et al. | |
| 5,499,750 A * | 3/1996 | Manifold | 222/386.5 |
| 5,507,275 A | 4/1996 | Clark | |
| 5,622,056 A * | 4/1997 | Utter | 62/121 |
| 5,673,818 A * | 10/1997 | Kaneski et al. | 222/105 |
| 5,852,836 A | 12/1998 | Montrose | |
| 5,911,520 A | 6/1999 | Kenney | |
| 5,961,048 A * | 10/1999 | Prieschl et al. | 239/146 |
| 5,979,793 A | 11/1999 | Louis | |
| 6,049,919 A | 4/2000 | Roteman | |
| 6,158,669 A * | 12/2000 | Louis | 239/146 |
| 6,220,526 B1 * | 4/2001 | Johnson | 239/323 |
| 6,651,907 B2 * | 11/2003 | Rodd | 239/332 |

* cited by examiner

Primary Examiner—Cheryl Tyler
Assistant Examiner—Richard L. Leung
(74) Attorney, Agent, or Firm—Shlesinger, Arkwright & Garvey LLP

(57) ABSTRACT

A portable, pressurized liquid storage system comprises a pliable and collapsible liquid reservoir including a fill pipe and a first valve disposed in the fill pipe; a pump operably connected to the reservoir; an outlet pipe including a second valve operably connected to the pump for connecting to a liquid-using device; and a housing in which the reservoir and the pump are disposed.

15 Claims, 3 Drawing Sheets

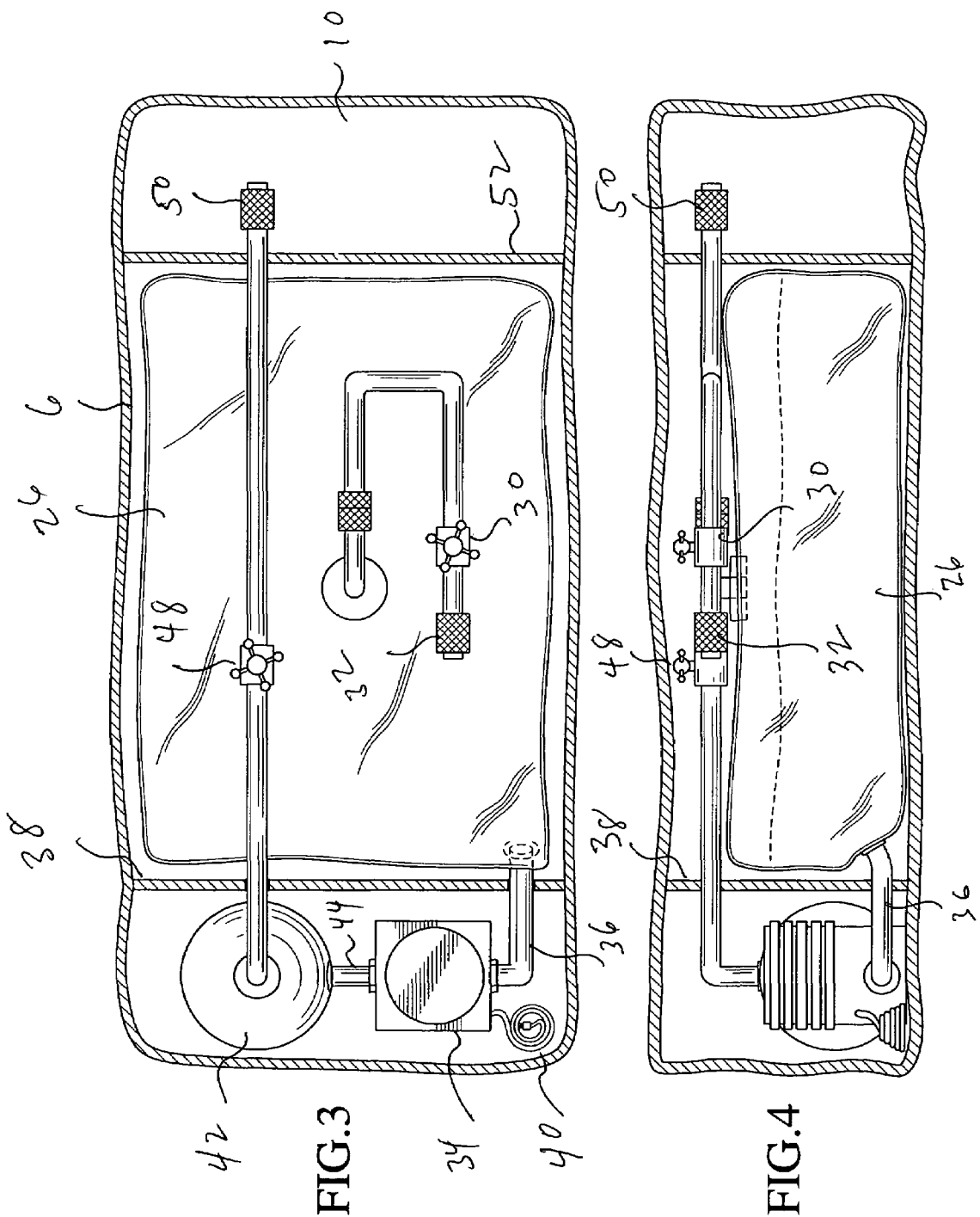

US 6,981,613 B1

PORTABLE PRESSURIZED LIQUID STORAGE SYSTEM

FIELD OF THE INVENTION

The present invention relates generally to a portable liquid storage system and particularly to a portable pressurized water storage system having a pliable, collapsible reservoir that can be carried around in a bag.

OBJECTS AND SUMMARY OF THE INVENTION

It is an object of the present invention to provide a portable, pressurized water storage system for various applications, such as for a portable shower, irrigation, cleaning, misting, etc., in an area where fresh water is not available.

It is another object of the present invention to provide a portable, pressurized liquid storage system that can be conveniently carried in a bag.

It is still another object of the present invention to provide a portable, pressurized liquid storage system that requires no air vents or relief valves for proper operation, thereby making the system liquid-tight.

It is another object of the present invention to provide a portable, pressurized liquid storage system that has a reservoir that is compact and pliable, and collapsible so that it occupies relatively small space when empty.

In summary, the present invention provides a portable, pressurized liquid storage system, comprising a pliable and collapsible reservoir including a fill pipe and a first valve disposed in the fill pipe; a pump operably connected to the reservoir; an outlet pipe including a second valve operably connected to the pump for connecting to a liquid dispensing fixture; and a housing in which the reservoir and the pump are disposed.

These and other objects of the present invention will become apparent from the following detailed description.

BRIEF DESCRIPTIONS OF THE DRAWINGS

FIG. 3 is a top cross-sectional view of FIG. 1.

FIG. 4 is a side cross-sectional view of FIG. 1.

DETAILED DESCRIPTION OF THE INVENTION

Figure 1:
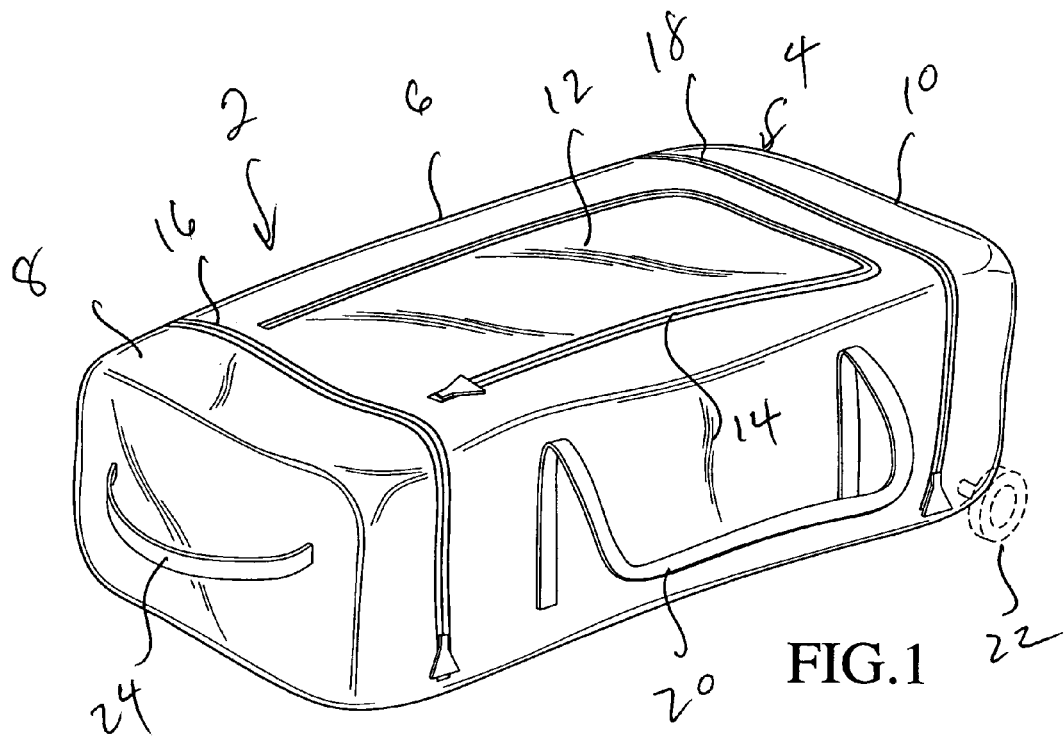
FIG. 1 is a perspective view of a bag housing the components of a portable pressurized liquid storage system made in accordance with the present invention.
Figure 2:
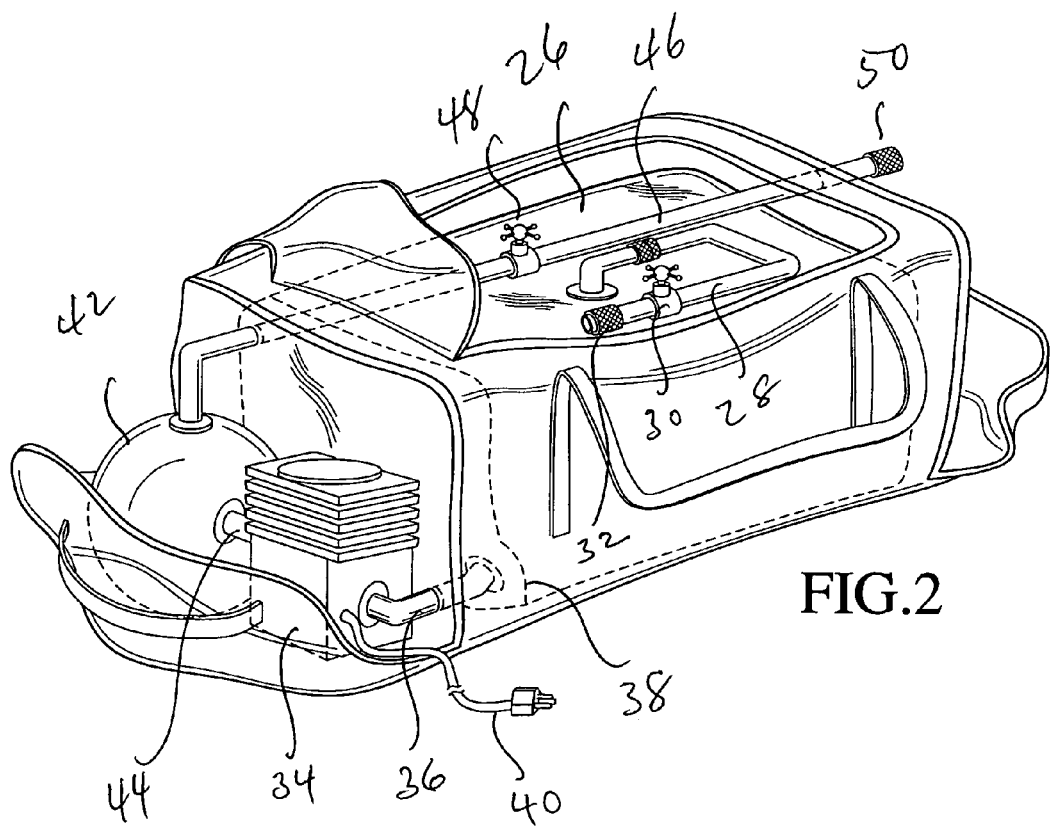
FIG. 2 is perspective view of the bag shown in FIG. 1, with the compartments opened to show the components of the system within.

A portable, pressurized liquid storage system embodying the invention is shown in FIGS. 1–4. The liquid storage system comprises a bag 4, preferably a soft exterior bag, such as a duffel bag or a backpack, that holds the various components of the system. The bag 4 includes a main compartment 6 and two smaller end compartments 8 and 10. Access to the main compartment 6 is provided by a closure flap 12 with a zipper closure 14 or other standard means. The closure 14 preferably traces a U-shaped pattern on the outer edge of the closure flap 12 adjacent the outer periphery of the main compartment to provide maximum opening into the interior of the main compartment. The end compartments 8 and 10 are accessed through respective zipper closures 16 and 18, preferably U-shaped, to provide maximum access into the respective interiors of the compartments. A pair of strap handles 20 on opposite sides of the main compartment 6 are used for carrying the bag 4. A pair of wheels 22 may be provided at one end of the bag 4 to allow the bag to be rolled about. A strap handle 24 is disposed at the other end of the bag 4 opposite the wheels 22 as a convenient handle when rolling the bag 4 on the wheels 22.

A pliable and collapsible liquid storage bladder 26 is disposed within the main compartment 6. The bladder 26 functions as a reservoir for the system. A fill pipe 28 communicates with the bladder 26. The fill pipe 28 can be flexible, such a rubber hose, or rigid. A valve 30 and a connector 32 are provided in the fill pipe 28. The connector 32 is used to connect to a liquid source, such as a water faucet via a garden hose, for filling the bladder 26. The valve 30 seals off the bladder after it has been filled up.

A pump 34 is connected to the bladder 26 by means of a pipe 36 which protrudes through a common wall 38 between the end compartment 8 and the main compartment 6. The pump 34 includes an electric cord 40 for connection to a power source, such as a car battery. The pump is preferably high pressure, low volume, about 3.5 gal/min, to conserve water and provide for varied applications, such as showering, irrigating plants, car washing, misting, etc.

An accumulator 42 may be provided to even out the output of the pump 34. A pipe 44 connects the output of the pump 34 to the accumulator 42. A pipe 46 is connected to the output of the accumulator 42. A valve 48 controls the output of the liquid from the system. A connector 50 is used to connect the output of the system to a liquid-using fixture, such as a shower head, garden hose nozzle, misting device, etc. The pipe 46 extends through an opening in the common wall 38. The pipe 56 can be flexible or rigid. While it is preferable to have the accumulator 42, it is not necessary for the proper operation of the system.

The pump 34 and the accumulator 42 are disposed in the end compartment 8. The closure 16 is advantageously configured to substantially expose the interior of the compartment to the atmosphere when the pump is operating to provide heat transfer from the pump to the atmosphere. Further, the soft pliable structure of the sides of the bag allows the compartment 8 when open to be flattened to expose the pump 34.

The end compartment 10 may be used to store other items, such as a length of flexible hose, nozzle, shower head, etc. The pipe 46 extends through a common wall 52 that separates the end compartment 10 from the main compartment 6.

Figure 5:
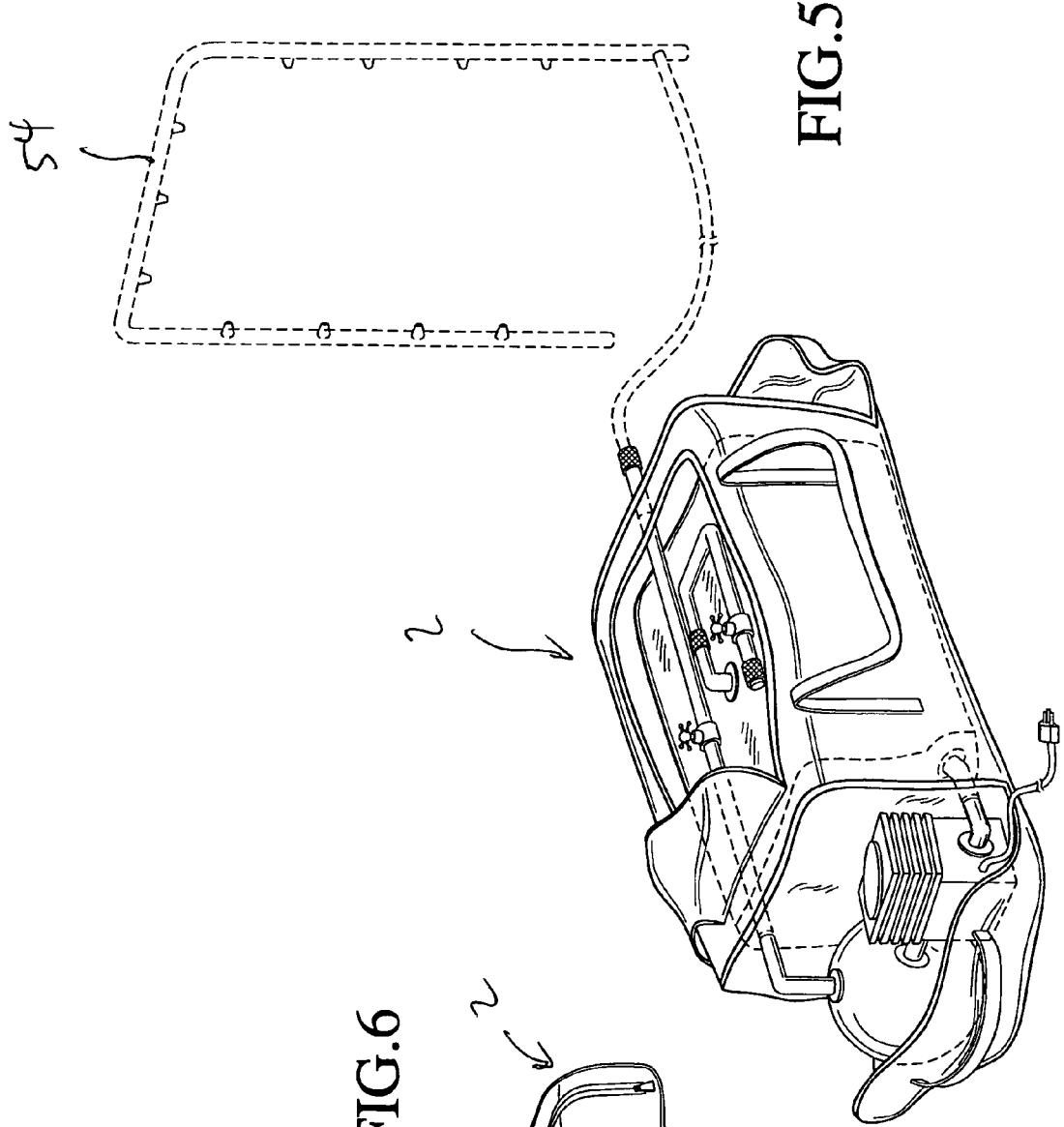
FIG. 5 is similar to FIG. 2, showing a water-using fixture connected to the system.

In use, the bladder 26 is filled with liquid, such as water, by connecting the connector 32 to a faucet via a hose. The valve 30 is opened to allow water into the bladder 26. When the bladder 26 is filled up, the valve 30 is closed and the connector 32 is disconnected from the hose. The pump 34 is then connected to an electric source, such as a battery. The pump 34 then charges the accumulator 42 to a pre-determined pressure. The connector 50 in the output pipe 46 is then connected to a water usage fixture, such as a misting device 54, as best shown in FIG. 5. The valve 48 is turned on to allow water to flow to water-using device, such as the misting device 54. A pressure cut-off switch (not shown) in the pump 34 would automatically control the on/off operation of the pump. When the pre-determined pressure is reached within the accumulator 42, the pump 34 would turn off. As water is drawn from the accumulator 42 and the pressure decreases below the pre-determined threshold, the pump 34 would then turn on to recharge the accumulator. As water is drawn from the bladder 26, the bladder would automatically deflate due to the vacuum created inside. When use is completed, the valve 48 is closed and the pump 34 is disconnected from its power source. The connector 50 is then disconnected from the water-using device.

Figure 6:
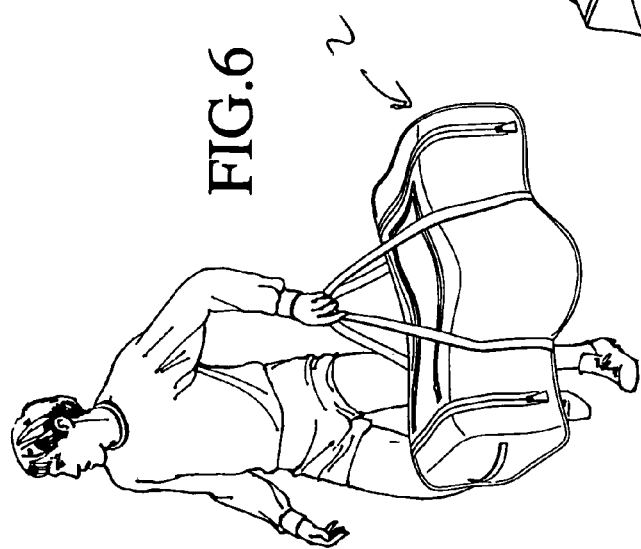
FIG. 6 shows the system in a bag as it is carried around by a user.

The system is liquid and air-tight so that it can be operated at any position, such as standing upright, lying on its side, upside down, etc., without spilling liquid or causing pump cavitations. With the use of a pliable and collapsible bladder 26, air vents or relief valves are not necessary for proper pump operation. Without a relief valve, the risk of spillage during transportation or use is also minimized. Further, the bladder 26 provides for a lower center of gravity so that the bag 4 does not have to be mounted to anything, since it would not fall over or roll around. Unlike hard containers which are bulky and top-heavy when full, tending to fall over during transportation, and occupies space even when empty, the bladder 26 when empty is compact, freeing up space in the bag 4 to carry other items and even when full tends to occupy less space and has a lower center of gravity, minimizing shifting when being transported. When the system is transported around, the bladder 26 would tend to seek a lower center of gravity, allowing for easy handling, as for example shown in FIG. 6.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A portable, pressurized liquid storage system, comprising:
   a) a pliable and collapsible liquid reservoir including a fill pipe and a first valve disposed in said fill pipe;
   b) a pump operably connected to said reservoir;
   c) an outlet pipe including a second valve operably connected to said pump for connecting to a liquid-using device;
   d) a housing in which said reservoir and said pump are disposed;
   e) said housing including wheels configured to allow said housing to be rolled about; and
   f) wherein said housing is a bag, said bag being pliable.

2. A portable, pressurized liquid storage system as in claim 1, wherein:
   a) said bag includes first and second compartments;
   b) said liquid reservoir is disposed within said first compartment; and
   c) said pump is disposed within said second compartment.

3. A portable, pressurized liquid storage system as in claim 2, wherein:
   a) said second compartment includes a first common wall with said first compartment; and
   b) said pump is operably connected to said reservoir by a connecting pipe, said connecting pipe extending through a first opening in said first common wall.

4. A portable, pressurized liquid storage system as in claim 3, wherein said outlet pipe extends through a second opening in said first common wall.

5. A portable, pressurized liquid storage system as in claim 3, wherein:
   a) said second compartment is openable along an area adjacent said first common wall; and
   b) said second compartment is configured when open to expose said pump to the outside.

6. A portable, pressurized liquid storage system as in claim 2, wherein said bag includes a third compartment.

7. A portable, pressurized liquid storage system as in claim 6, wherein said bag includes a common wall between said first compartment and said third compartment.

8. A portable, pressurized liquid storage system as in claim 2, wherein said first compartment includes a closure flap disposed on top thereof.

9. A portable, pressurized liquid storage system as in claim 2, wherein said bag includes first and second straps disposed respectively on opposite sides of said bag.

10. A portable, pressurized liquid storage system as in claim 1, and further comprising:
    a) an accumulator serially connected to an output of said pump; and
    b) said outlet pipe is operably connected to said accumulator.

11. A portable, pressurized liquid storage system as in claim 1, wherein said reservoir is a bladder.

12. A portable, pressurized liquid storage system as in claim 1, wherein said reservoir automatically collapses as it empties, thereby requiring no relief valve.

13. A portable, pressurized liquid storage system as in claim 1, wherein said wheels are disposed at one end of said bag.

14. A portable, pressurized liquid storage system as in claim 1, wherein said bag includes a strap to pull said bag on said wheels.

15. A portable, pressurized liquid storage system, comprising:
    a) a pliable and collapsible liquid reservoir including a fill pipe and a first valve disposed in said fill pipe;
    b) a pump operably connected to said reservoir;
    c) an outlet pipe including a second valve operably connected to said pump for connecting to a liquid-using device;
    d) a housing in which said reservoir and said pump are disposed;
    e) said housing including wheels configured to allow said housing to be rolled about;
    f) said housing is a bag including first and second compartments;
    g) said liquid reservoir is disposed within said first compartment; and
    h) said pump is disposed within said second compartment.

* * * * *